(12) United States Patent
Liu et al.

(10) Patent No.: US 12,470,834 B2
(45) Date of Patent: Nov. 11, 2025

(54) RANGING SYSTEM AND RANGING METHOD THEREOF

(71) Applicant: LITE-ON TECHNOLOGY CORPORATION, Taipei (TW)

(72) Inventors: Tzu-Chia Liu, Taipei (TW); Chi-Min Weng, Taipei (TW); Jiun-Shiung Chen, Taipei (TW)

(73) Assignee: LITE-ON TECHNOLOGY CORPORATION, Taipei (TW)

( * ) Notice: Subject to any disclaimer, the term of this patent is extended or adjusted under 35 U.S.C. 154(b) by 0 days.

(21) Appl. No.: 18/733,890

(22) Filed: Jun. 5, 2024

(65) Prior Publication Data

US 2025/0008230 A1  Jan. 2, 2025

Related U.S. Application Data

(60) Provisional application No. 63/523,400, filed on Jun. 27, 2023.

(30) Foreign Application Priority Data

Apr. 19, 2024  (CN) .......................... 202410476928.0

(51) Int. Cl.
*H04N 23/81* (2023.01)
*H04N 5/262* (2006.01)
(Continued)

(52) U.S. Cl.
CPC ........... *H04N 23/81* (2023.01); *H04N 5/2628* (2013.01); *H04N 7/18* (2013.01); *H04N 23/88* (2023.01); *H04N 23/90* (2023.01)

(58) Field of Classification Search
CPC .. G06T 7/593; G06T 7/50; G06T 7/55; G06T 2207/30248; G06T 2207/30252;
(Continued)

(56) References Cited

U.S. PATENT DOCUMENTS 11,792,382 B2 * 10/2023 Ding ................... G05D 1/0231
348/47
11,882,262 B2 * 1/2024 Danziger ................ G06T 7/246
(Continued)

FOREIGN PATENT DOCUMENTS

CN   110631556 A   12/2019
WO   WO2024093372 A1   5/2024

OTHER PUBLICATIONS

Search report issued by European Patent Office on Dec. 3, 2024.
(Continued)

*Primary Examiner* — Boubacar Abdou Tchoussou
(74) *Attorney, Agent, or Firm* — WPAT, PC

(57) ABSTRACT

A ranging system includes a pinhole camera, a fisheye camera and a processor. The pinhole camera captures a pinhole image. The fisheye camera captures a fisheye image. The processor performs a undistorting process on the fisheye image to obtain a corresponding undistorted fisheye image, perform a size-converting process on the pinhole image to obtain a corresponding size-converted pinhole image, obtain a transformation relation between a pinhole image plane of the pinhole camera and a fisheye image plane of the fisheye camera, obtain a corresponding point of the corresponding undistorted fisheye image corresponding to a target point of the corresponding size-converted pinhole image based on the transformation relation, and obtain a distance between the ranging system and the physical point based on the transformation relation, the target point and the corresponding point.

20 Claims, 11 Drawing Sheets

(51) Int. Cl.
    *H04N 7/18*      (2006.01)
    *H04N 23/88*     (2023.01)
    *H04N 23/90*     (2023.01)
(58) Field of Classification Search
    CPC . G06T 2207/30256; G06T 2207/30261; G06T 2207/30264
    See application file for complete search history.

(56)  References Cited

U.S. PATENT DOCUMENTS

| | | | | |
|---|---|---|---|---|
| 2014/0063287 A1* | 3/2014 | Yamada | ............... | H04N 23/673 348/229.1 |
| 2023/0141515 A1* | 5/2023 | Danziger | ............. | H04N 13/122 348/47 |
| 2025/0095379 A1* | 3/2025 | Sakthi | ..................... | G06T 7/579 |

OTHER PUBLICATIONS

Alfie, Problem with rectifying pinhole and fisheye image_Feb. 2023, Feb. 2023.
Computer stereo vision—Wikipedia_Dec. 19, 2022.
Jeon et al., Stereo Matching with Color and Monochrome Cameras in Low-Light Conditions_Jun. 27, 2016, 2016 IEEE Conference on Computer Vision and Pattern Recognition.
Epipolar geometry—Wikipedia_Dec. 4, 2022.

* cited by examiner

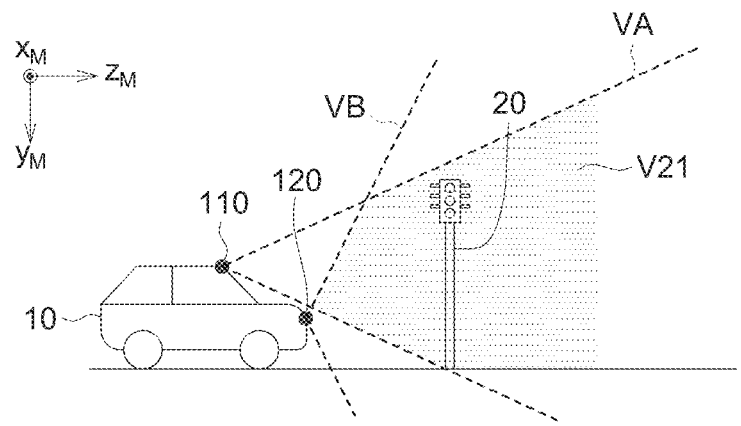
FIG. 6B1
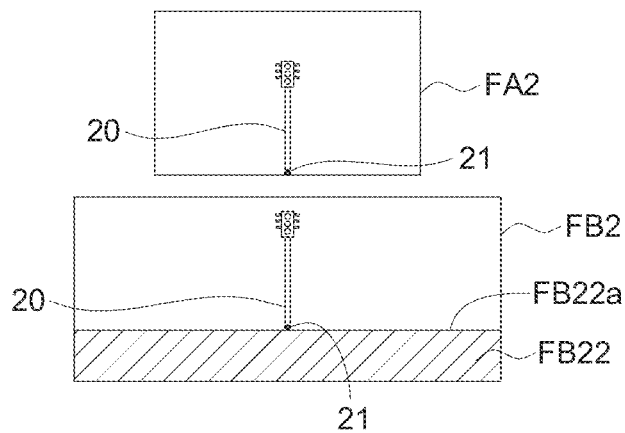
FIG. 6B2

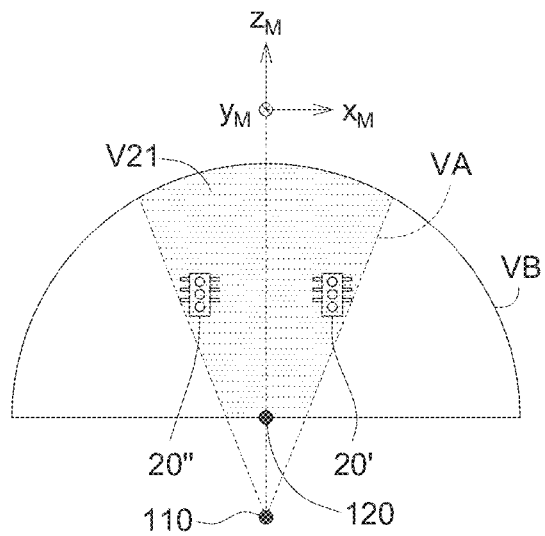
FIG. 6C1
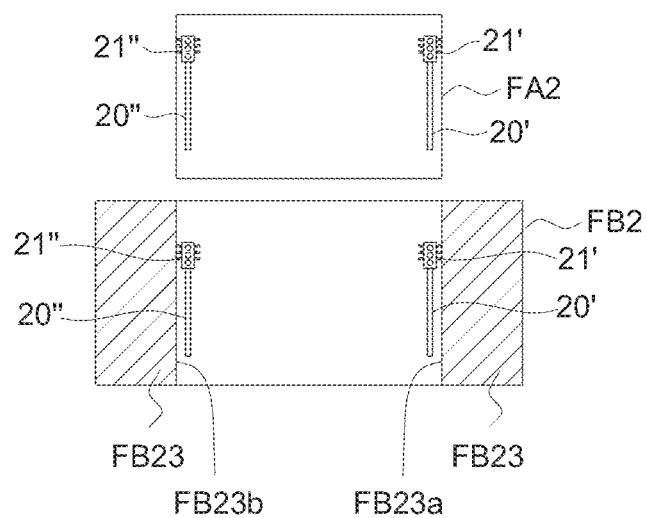
FIG. 6C2

RANGING SYSTEM AND RANGING METHOD THEREOF

This application claims the benefit of U.S. provisional application Ser. No. 63/523,400, filed Jun. 27, 2023, the subject matter of which is incorporated herein by reference, and claims the benefit of People's Republic of China application Serial No. 202410476928.0, filed on Apr. 19, 2024, the subject matter of which is incorporated herein by reference.

BACKGROUND OF THE INVENTION

Field of the Invention

The invention relates in general to a ranging system and a ranging method thereof.

Description of the Related Art

A vehicle driving on the road shuttles among other vehicles, pedestrians and obstacles, and thus inevitably encounters many road conditions. In general, the closer the distance between the vehicle and the vehicle (or pedestrian), the more probability of a traffic accident occur. Therefore, it is necessary to propose a method that may detect the distance between the vehicle and its surrounding objects (other vehicle, pedestrian, obstacle, etc.) to make it easier for drivers to stay on top of the road conditions.

SUMMARY OF THE INVENTION

According to an embodiment of the present invention, a ranging system is provided. The ranging system includes a pinhole camera, a fisheye camera and a processor. The pinhole camera has a first field-of-view and is configured to capture a pinhole image of a scene. The fisheye camera has a second field-of-view and is configured to capture a fisheye image of the scene, wherein the second field-of-view is larger than the first field-of-view. The processor is configured to perform a undistorting process on the fisheye image to obtain a corresponding undistorted fisheye image; perform a size-converting process on the pinhole image to obtain a corresponding size-converted pinhole image, wherein the size-converted pinhole image is consistent with the undistorted fisheye image in imaging size; obtain a transformation relation between a pinhole image plane of the pinhole camera and a fisheye image plane of the fisheye camera; obtain a corresponding point of the undistorted fisheye image corresponding to a target point of the size-converted pinhole image based on the transformation relation, wherein the target point and the corresponding point correspond to a physical point; and obtain a distance between the ranging system and the physical point based on the transformation relation, the target point and the corresponding point.

According to another embodiment of the present invention, a ranging method includes the following steps: capturing, by a pinhole camera, a pinhole image of a scene, wherein the pinhole camera has a first field-of-view; capturing, by a fisheye camera, a fisheye image of the scene, wherein the fisheye camera has a second field-of-view, wherein the second field-of-view is larger than the first field-of-view; performing, by a processor, a undistorting process on the fisheye image to obtain a corresponding undistorted fisheye image; performing, by the processor, a size-converting process on the pinhole image to obtain a corresponding size-converted pinhole image, wherein the size-converted pinhole image is consistent with the undistorted fisheye image in imaging size; obtaining, by the processor, a transformation relation between a pinhole image plane of the pinhole camera and a fisheye image plane of the fisheye camera; obtaining, by the processor, a corresponding point of the undistorted fisheye image corresponding to a target point of the size-converted pinhole image based on the transformation relation, wherein the target point and the corresponding point correspond to a physical point; and obtaining, by the processor, a distance between the ranging system and the physical point based on the transformation relation, the target point and the corresponding point.

According to another embodiment of the present invention, a ranging system is provided. The ranging system is adapted for a mobile vehicle. The ranging system includes a first camera, a second camera and a processor. The first camera has a first field-of-view and is configured to capture a first image of a scene. The second camera has a second field-of-view and is configured to capture a second image of the scene, wherein the second field-of-view is larger than the first field-of-view. The processor is configured to perform a undistorting process on one of the first image and the second image to obtain a corresponding undistorted image; calculate a size conversion proportion based on camera parameters of the first camera and the second camera and perform a size-converting process on the other of the first image and the second image to obtain a corresponding size-converted image based on the size conversion proportion, wherein the size-converted image is consistent with the undistorted image in imaging size; obtain a transformation relation between a first image plane of the first camera and a second image plane of the second camera; obtain a corresponding point of the undistorted image corresponding to a target point of the size-converted image based on the transformation relation, wherein the target point and the corresponding point correspond to a physical point; obtain a distance between the ranging system and the physical point based on the transformation relation, the target point and the corresponding point.

According to another embodiment of the present invention, a ranging method includes the following steps: capturing, by a first camera, a first image of a scene, wherein the first camera has a first field-of-view; capturing, by a second camera, a second image of the scene, wherein the second camera has a second field-of-view, and the second field-of-view is larger than the first field-of-view; performing, by a processor, a undistorting process on one of the first image and the second image to obtain a corresponding undistorted image; calculate, by the processor, a size conversion proportion by camera parameters of the first camera and the second camera and performing a size-converting process on the other of the first image and the second image based on the size conversion proportion to obtain a corresponding size-converted image, wherein the size-converted image is consistent with the undistorted image in imaging size; obtaining, by the processor, a transformation relation between a first image plane of the first camera and a second image plane of the second camera; obtain, by the processor, a corresponding point of the undistorted image corresponding to a target point of the size-converted image based on the transformation relation, wherein the target point and the corresponding point correspond to a physical point; and obtain, by the processor, a distance between the ranging system and the physical point based on the transformation relation, the target point and the corresponding point.

The above and other aspects of the invention will become better understood with regard to the following detailed description of the preferred but non-limiting embodiment(s). The following description is made with reference to the accompanying drawings.

BRIEF DESCRIPTION OF THE DRAWINGS

FIG. 6B1 illustrates a schematic diagram of a relation between a first FoV of the pinhole camera, a second FoV of the fisheye camera and an object of FIG. 1B at a viewing angle;

FIG. 6B2 illustrates a schematic diagram of the object, the size-converted pinhole image and the undistorted fisheye image of FIG. 6B1;

FIG. 6C1 illustrates a schematic diagram of a relation between the first FoV of the pinhole camera, the second FoV of the fisheye camera and the object of FIG. 1B at another viewing angle;

FIG. 6C2 illustrates a schematic diagram of the object 20, the size-converted pinhole image FA2 and the undistorted fisheye image FB2 of FIG. 6C1;

DETAILED DESCRIPTION OF THE INVENTION

Figure 1A:
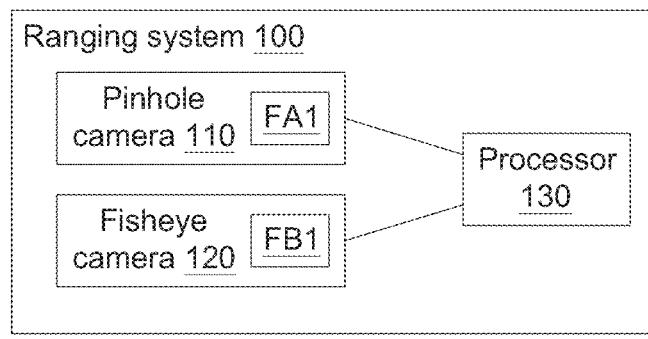
FIG. 1A illustrates a schematic diagram of a functional block of a ranging system according to an embodiment of the present invention.
Figure 1B:
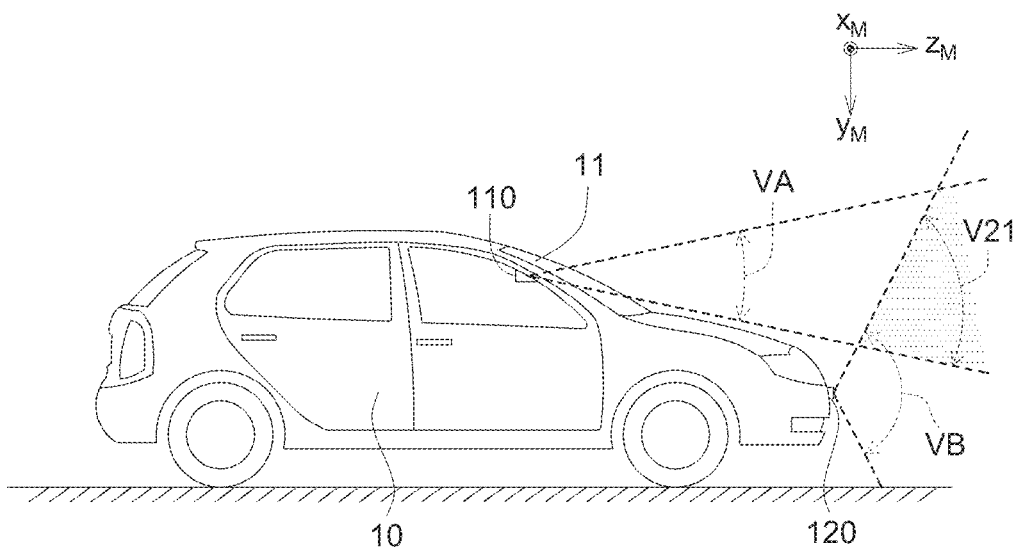
FIG. 1B illustrates a schematic diagram of a pinhole camera and a fisheye camera in FIG. 1A disposed on a mobile vehicle.
Figure 2A:
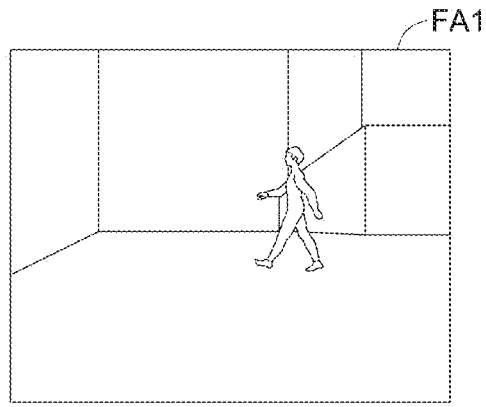
FIG. 2A illustrates a schematic diagram of a pinhole image in FIG. 1A.
Figure 2B:
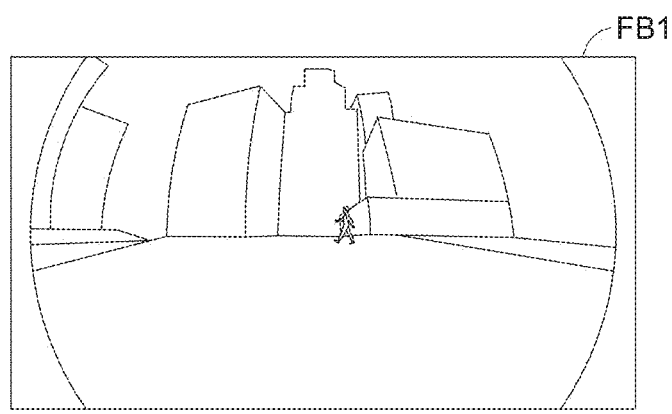
FIG. 2B illustrates a schematic diagram of a fisheye image of FIG. 1A.
Figure 3:
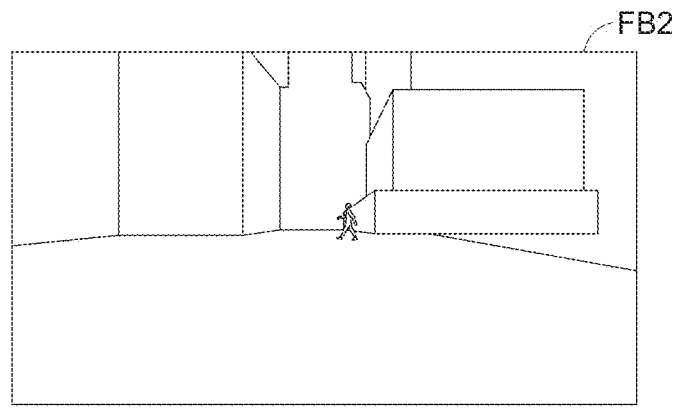
FIG. 3 illustrates a schematic diagram of a undistorted fisheye image after a undistorting process is performed on the fisheye image FB1.
Figure 4:
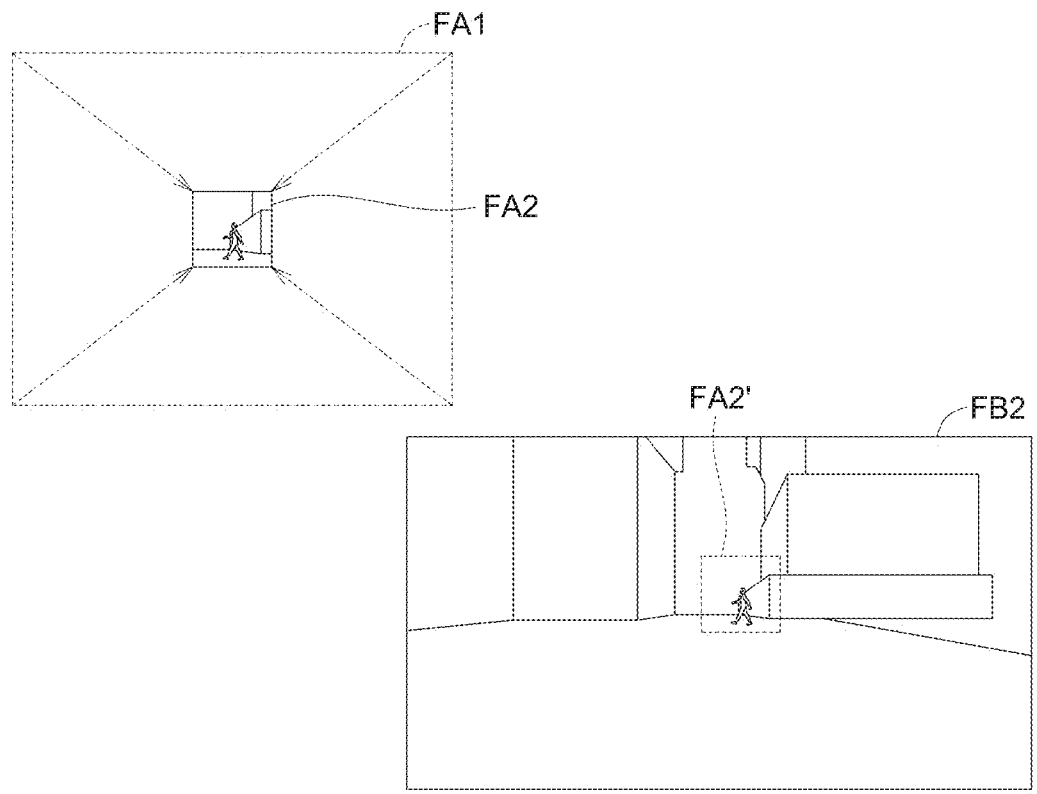
FIG. 4 illustrates a schematic diagram of a size-converted pinhole image after a size-converting process is performed on the pinhole image.
Figure 5:
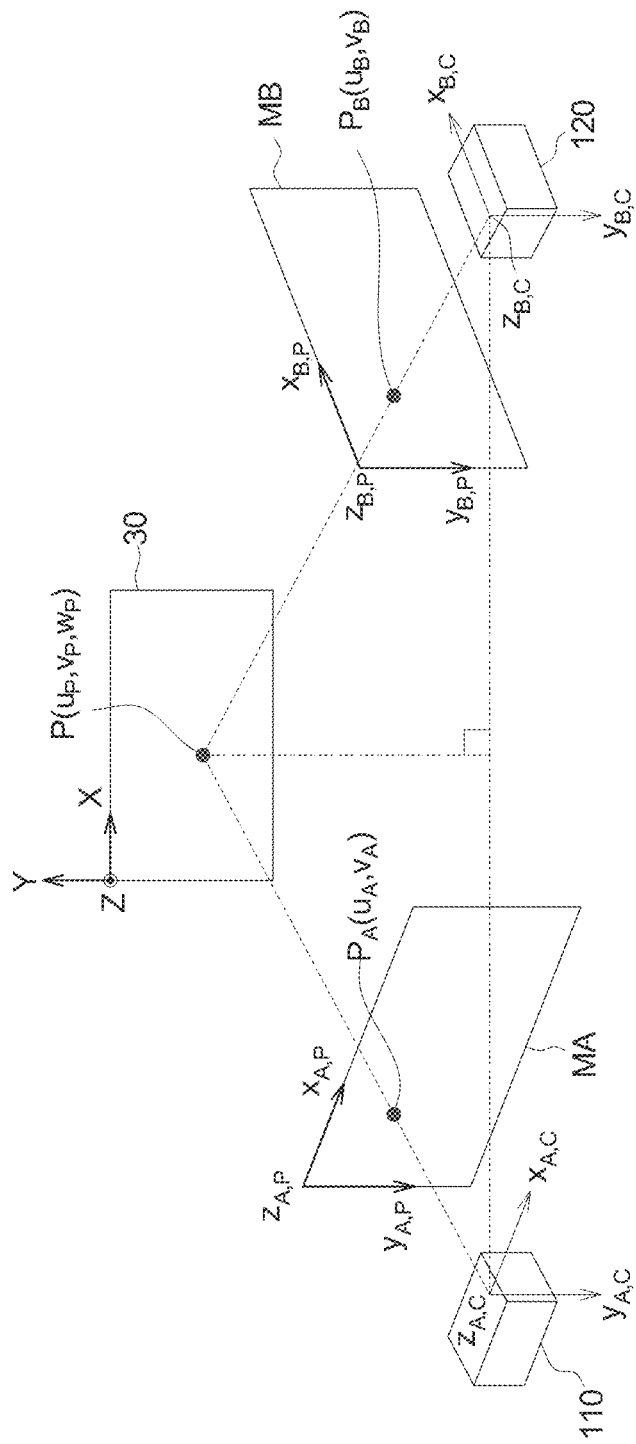
FIG. 5 illustrates a schematic diagram of a relation between a pinhole image plane of the pinhole camera and a fisheye image plane of the fisheye camera in FIG. 1A relative to a world coordinate system.
Figure 6A:
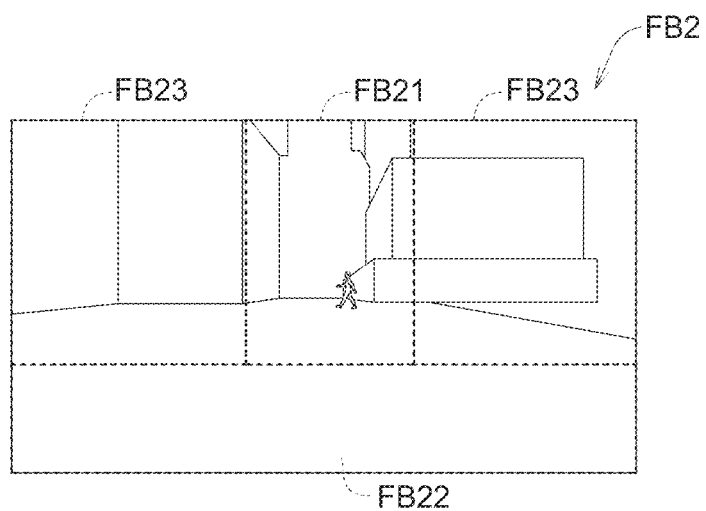
FIG. 6A illustrates a schematic diagram of a field-of-view (FoV) overlapping region and a non-FoV overlapping regions of the undistorted fisheye image in FIG. 3.
Figure 7:
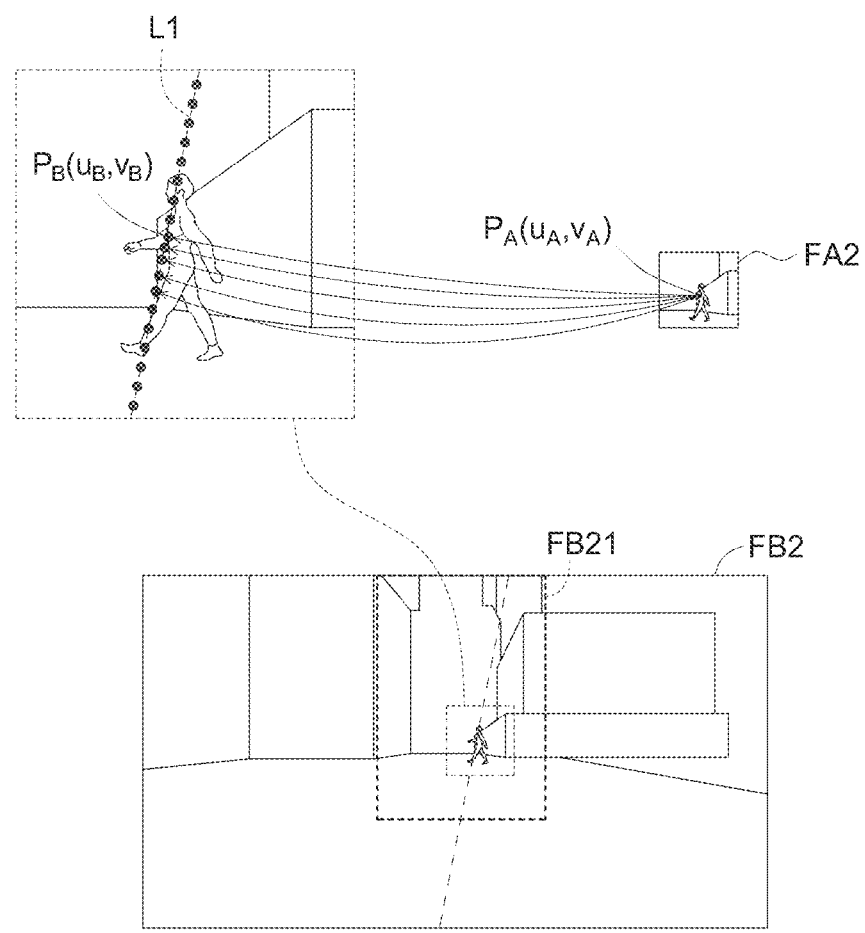
FIG. 7 illustrates a schematic diagram of a target point of the size-converted pinhole image corresponding to a epipolar line of the undistorted fisheye image of FIG. 4.
Figure 8:
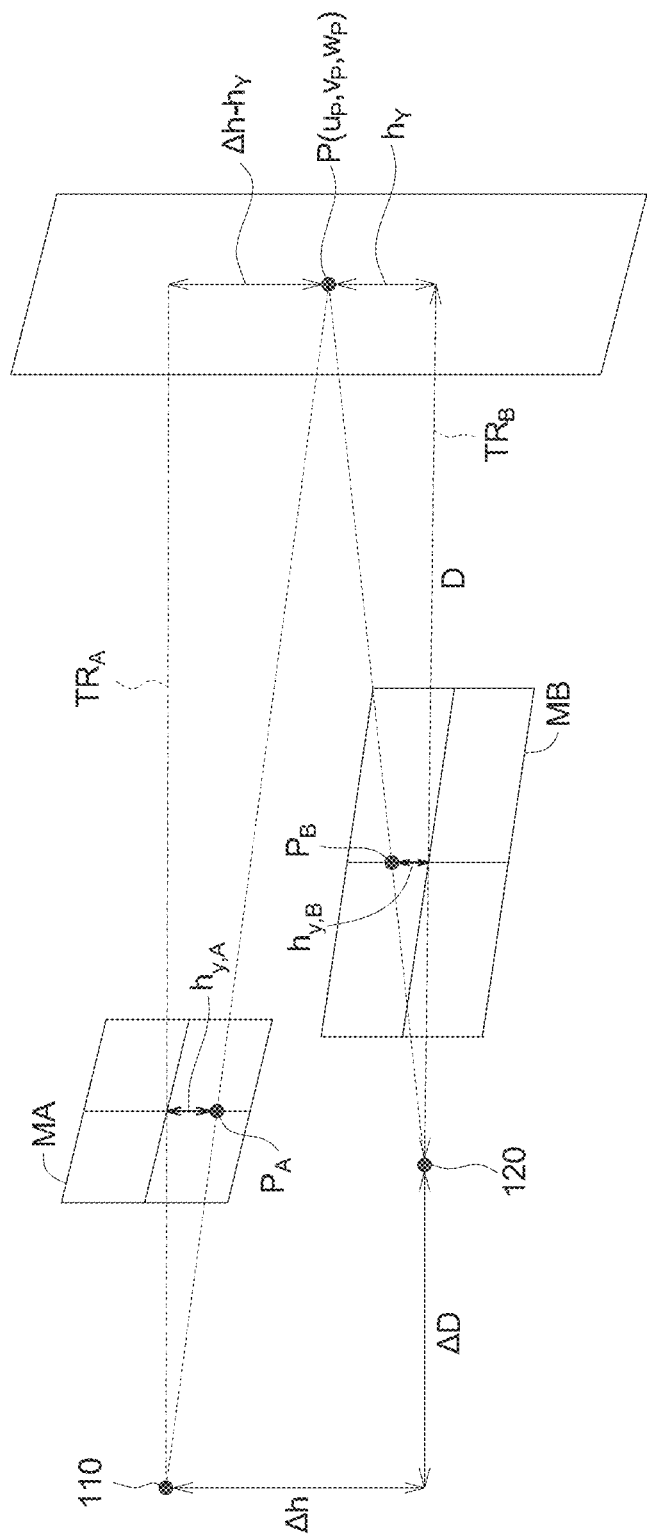
FIG. 8 illustrates a schematic diagram of a distance between the fisheye camera and a physical point according to an embodiment of the present invention.
Figure 9:
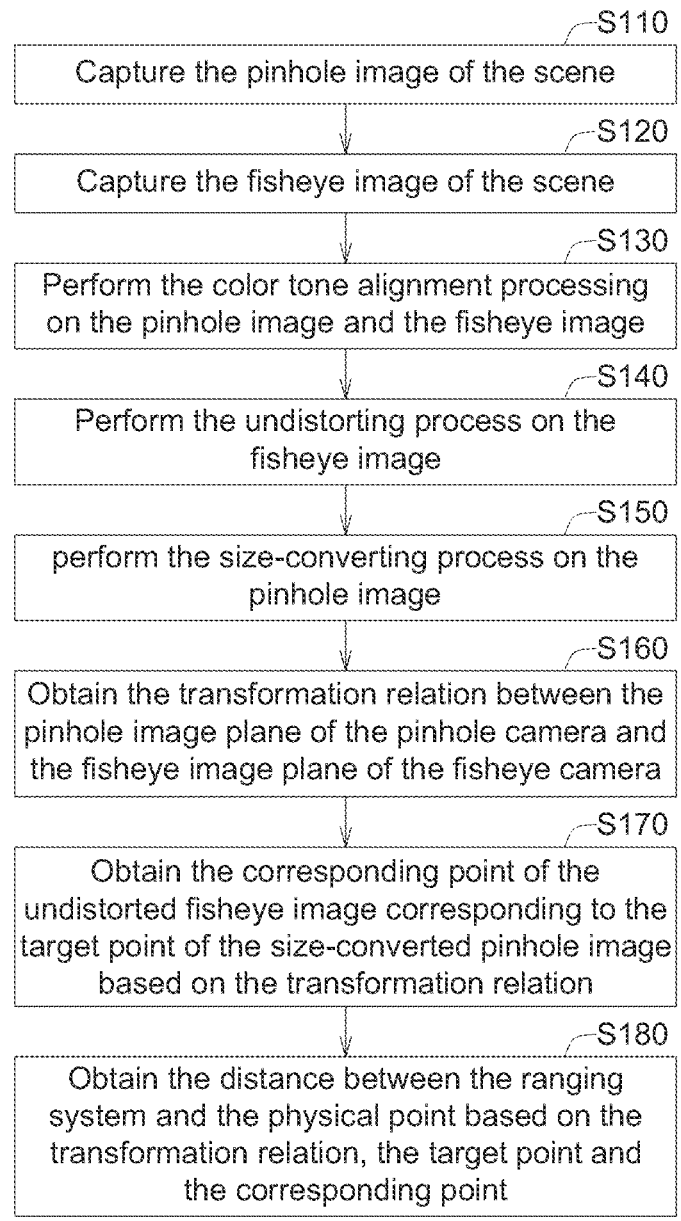
FIG. 9 illustrates a flow chart of a ranging method of the ranging system in FIG. 1A.
Figure 10:
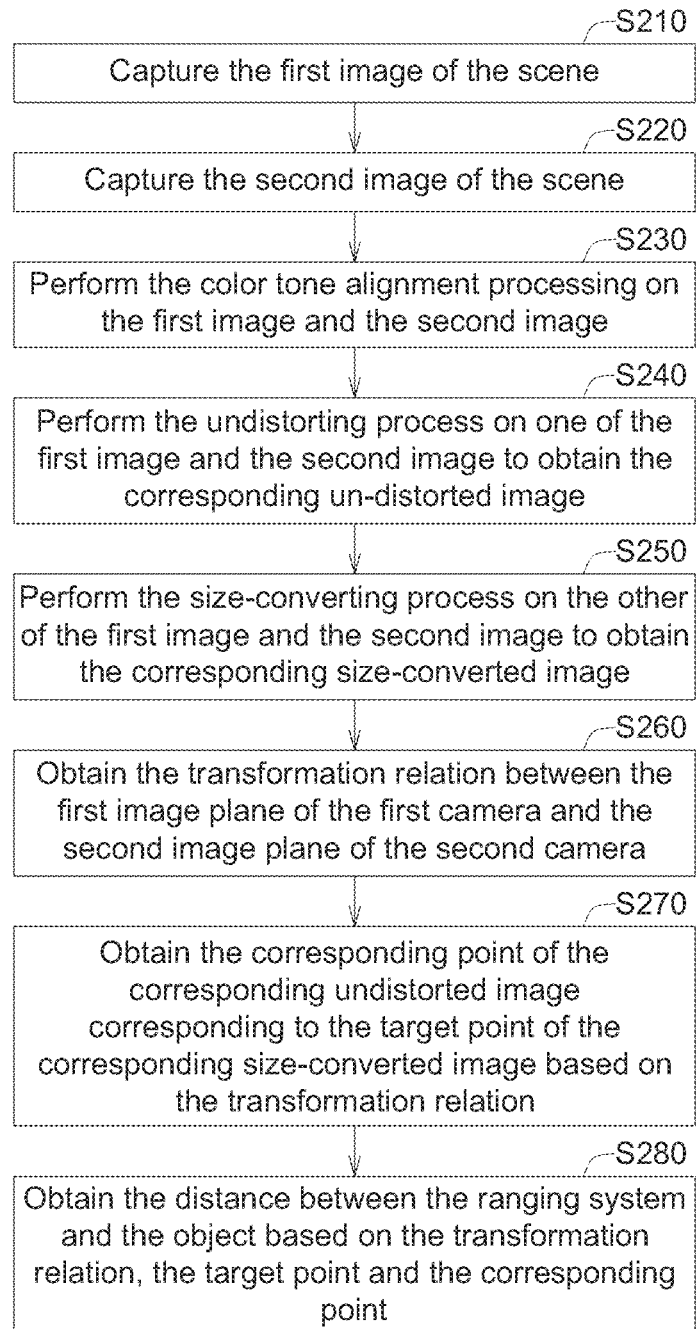
FIG. 10 illustrates a flow chart of a ranging method according to another embodiment of the present invention.

Referring to FIGS. 1 to 9, FIG. 1A illustrates a schematic diagram of a functional block of a ranging system 100 according to an embodiment of the present invention, FIG. 1B illustrates a schematic diagram of a pinhole camera 110 and a fisheye camera 120 in FIG. 1A disposed on a mobile vehicle 10, FIG. 2A illustrates a schematic diagram of a pinhole image FA1 in FIG. 1A, FIG. 2B illustrates a schematic diagram of a fisheye image FB1 of FIG. 1A, FIG. 3 illustrates a schematic diagram of a undistorted fisheye image FB2 after a undistorting process is performed on the fisheye image FB1, FIG. 4 illustrates a schematic diagram of a size-converted pinhole image FA2 after a size-converting process is performed on the pinhole image FA1, FIG. 5 illustrates a schematic diagram of a relation between a pinhole image plane MA of the pinhole camera 110 and a fisheye image plane MB of the fisheye camera 120 in FIG. 1A relative to a world coordinate system X-Y-Z, FIG. 6A illustrates a schematic diagram of a field-of-view (FoV) overlapping region FB21 and a non-FoV overlapping regions FB22 and FB23 of the undistorted fisheye image FB2 in FIG. 3, FIG. 6B1 illustrates a schematic diagram of a relation between a first FoV VA of the pinhole camera 110, a second FoV VB of the fisheye camera 120 and an object 20 of FIG. 1B at a viewing angle, FIG. 6B2 illustrates a schematic diagram of the object 20, the size-converted pinhole image FA2 and the undistorted fisheye image FB2 of FIG. 6B1, FIG. 6C1 illustrates a schematic diagram of a relation between the first FoV VA of the pinhole camera 110, the second FoV VB of the fisheye camera 120 and the object 20 of FIG. 1B at another viewing angle, FIG. 6C2 illustrates a schematic diagram of the object 20, the size-converted pinhole image FA2 and the undistorted fisheye image FB2 of FIG. 6C1, FIG. 7 illustrates a schematic diagram of a target point $P_A$ of the size-converted pinhole image FA2 corresponding to a epipolar line L1 of the undistorted fisheye image FB2 of FIG. 4, FIG. 8 illustrates a schematic diagram of a distance D between the fisheye camera 120 and a physical point (or an entity point) P according to an embodiment of the present invention, and FIG. 9 illustrates a flow chart of a ranging method of the ranging system 100 in FIG. 1A. FIG. 10 illustrates a flow chart of a ranging method according to another embodiment of the present invention.

As illustrated in FIGS. 1A and 1B, the ranging system 100 may be disposed on the mobile vehicle 10, where the mobile vehicle 10 is, for example, a vehicle which includes at least two wheels. For example, the mobile vehicle 10 is, for example, a bicycle, a motorcycle, a car, a bus, and other various vehicle capable of carrying people, animals, and/or goods. The ranging system 100 includes the pinhole camera 110, the fisheye camera 120 and a processor 130. In an embodiment, the fisheye camera 120 may be disposed at a front end (for example, the front of the vehicle) or a rear end of the mobile vehicle 10, while the pinhole camera 110 may be disposed between the front end and the rear end of the mobile vehicle 10, for example, on a windshield 11 of the mobile vehicle 10. In addition, the processor 130 is electrically connected to the pinhole camera 110 and the fisheye camera 120 to control the pinhole camera 110 and the fisheye camera 120, and configured to process and/or analyze the collected signal from the pinhole camera 110 and the collected signal from the fisheye camera 120. In addition, the processor is, for example, a physical circuit, such as a semiconductor chip, a semiconductor package, etc. which is formed by using at least one semiconductor process.

As illustrated in FIGS. 1A and 1B, the pinhole camera 110 has the first field-of-view VA (the first field-of-view VA is illustrated in FIG. 1B) and is configured to capture the pinhole image FA1 of the scene (the pinhole image FA1 is illustrated in FIG. 2A). The fisheye camera 120 has the second field-of-view VB (the second field-of-view VB is illustrated in FIG. 1B) and is configured to capture the fisheye image FB1 of the scene (the fisheye image FB1 is illustrated in FIG. 2B), wherein the second field-of-view VB is greater than the first field-of-view VA. The processor 130 is configured to: perform the undistorting process on the fisheye image FB1 to obtain the corresponding undistorted fisheye image FB2 (the undistorted fisheye image FB2 is illustrated in FIG. 3); perform the size-converting process on the pinhole image FA1 to obtain the corresponding size-converted pinhole image FA2 (the size-converted pinhole image FA2 is illustrated in FIG. 4), wherein the size-converted pinhole image FA2 and the undistorted fisheye image FB2 are consistent in imaging size; obtain a transformation relation between the pinhole image plane MA (the pinhole image plane MA is illustrated in FIG. 5) of the pinhole camera 110 and the fisheye image plane MB (the fisheye image plane MB is illustrated in in FIG. 5) of the fisheye camera 120; based on the transformation relation, obtain a corresponding point $P_B$ of the size-converted pinhole image FA2 corresponding to the target point $P_A$ of the size-converted pinhole image FA2, wherein the target point $P_A$ and the corresponding point $P_B$ correspond the physical point P (the physical point P is illustrated in FIG. 8); and obtain the distance D (the distance D is illustrated in FIG. 8) between the ranging system 100 and the physical point P according to the transformation relation, the target point $P_A$ and the corresponding point $P_B$. As a result, driver may stay on top of the road conditions according to the distance D. In an embodiment, the processor 130 may determine whether the distance D is less than a dangerous value (for example, ranging between 3 meters and 20 meters according to the vehicle speed), and if so, may control an indicator (not illustrated) to send a warning signal (not illustrated), wherein the indicator is, for example, a speaker, a display screen, a light emitter, etc., and the warning signal is, for example, a sound, an image, light, etc.

In addition, in the ranging technology of the embodiment of the present invention, the relative configuration relation between the pinhole camera 110 and the fisheye camera 120 may not be limited. For example, the pinhole camera 110 and the fisheye camera 120 may be staggered in a length direction (for example, parallel to a $z_M$ axis) and a height direction (for example, parallel to a $y_M$ axis) of the mobile vehicle 10, but not staggered in a width direction of the moving vehicle 10 (for example, parallel to a $x_M$ axis). For example, the pinhole camera 110 and the fisheye camera 120 may be located at a $y_M$-$z_M$ plane, but respectively located at different heights in the $y_M$ axis of the $y_M$-$z_M$ plane; or, the pinhole camera 110 and the fisheye camera 120 may be staggered in the length direction and the width direction of the mobile vehicle 10, that is, the pinhole camera 110 and the fisheye camera 120 respectively are located at different $x_M$-$y_M$ planes and different $y_M$-$z_M$ planes. In addition, in the present embodiment, the number of the pinhole camera 110 disposed on the windshield 11 may be one, and it may save hardware cost.

The parameters used by the ranging system 100 in the embodiment of the present invention to perform ranging may be intrinsic parameters and/or extrinsic parameters of the camera. The intrinsic parameters include a camera matrix and distortion coefficients, etc., wherein the camera matrix may include a focal length, a principal point, etc. The function of the extrinsic parameters is for converting a camera coordinate system into a reference coordinate system. Specifically, the extrinsic parameters include a rotation matrix and translation vectors, wherein the rotation matrix and translation vector are related to a camera location, and represent a translation distance and a rotation angle of the camera relative to an origin (for example, an origin of the camera coordinate system) of a world coordinate system. After obtaining the intrinsic parameters, taking another picture of a calibration tool 30 (for example, the calibration tool 30 is illustrated in FIG. 5) may obtain the rotation matrix and the translation vector of the camera at that time. Through the extrinsic parameters, the coordinates of the camera in a three-dimensional (3D) space may be obtained. The calibration tool 30 is, for example, a calibration checkerboard.

The process of the ranging method according to an embodiment of the present invention is described below with reference to FIG. 9 together with FIGS. 1 to 8.

In step S110, as illustrated in FIGS. 1A, 1B and 2A, the pinhole camera 110 captures the pinhole image FA1 of the scene, wherein the pinhole camera 110 has the first field-of-view VA. The scene of the present embodiment is, for example, an outdoor environment or an indoor space.

In step S120, as illustrated in FIG. 1A, FIG. 1B and FIG. 2B, the fisheye camera 120 captures the fisheye image FB1 of the scene. The fisheye camera 120 has the second field-of-view VB. The second visual field VB is a wide-angle FoV, for example, equal to or greater than 180 degrees. Due to the wide-angle FoV, the fisheye image FB1 has significant distortion and the distortion of the fisheye image FB1 is greater than the distortion of the pinhole image FA1.

In step S130, the processor 130 may perform color tone alignment processing on the pinhole image FA1 and the fisheye image FB1 by using, for example, color white balance, etc., so that the pinhole image FA1 and the fisheye image FB1 are consistent in tone. After color tone alignment processing, the color variation of pinhole image FA1 and fisheye image FB1 may be reduced. In an embodiment, after color tone alignment processing, the pinhole image FA1 and the fisheye image FB1 may be converted into grayscale images.

According to the images captured by different cameras, an intensity (for example, gray-level value) distribution of each channel may be obtained according to three RGB (red/green/blue) channels or a gray-level intensity of the image, and a histogram equalization algorithm may be used for achieving the frequency distribution of each grayscale or color in the image is close. The processor 130 may perform the aforementioned color tone alignment processing on two images with different color tones according to the specified channel intensity in the histogram distribution.

In step S140, as illustrated in FIG. 3, the processor 130 may perform the undistorting process on the fisheye image FB1 or the pinhole image FA1 in FIG. 2B. For example, when the processor 130 performs the undistorting process on the fisheye image FB1 in FIG. 2B to obtain the corresponding undistorted fisheye image FB2, a fisheye projection model may approximate to a perspective projection model of the pinhole imaging in the projection effect. As illustrated in FIG. 3, the distortion of the undistorted fisheye image FB2 is very small or almost equal to 0. In an embodiment, if necessary, the processor 130 may perform the undistorting process on the pinhole image FA1, and the processing for the pinhole image FA1 described below is all directed to the undistorted pinhole image FA1. In addition, as long as the distortion of the image may be reduced, the embodiments of the present invention are not limited to the aforementioned undistorting process. Undistorting process requires the intrinsic parameters of the camera, such as distortion coefficients.

In step S150, as illustrated in FIG. 4, the processor 130 may perform the size-converting process on the pinhole image. The following is an embodiment of step S150, but the invention is not limited thereto. For example, the size-converting process is performed on the pinhole image FA1 in FIG. 2A to obtain the corresponding size-converted pinhole image FA2, wherein the size-converted pinhole image FA2 and the undistorted fisheye image FB2 are consistent in imaging size after such size-converting. Furthermore, the imaging of the size-converted pinhole image FA2 overlaps at least partially or almost entirely with the imaging of the corresponding region FA2' of the undistorted fisheye image FB2. In an embodiment, if necessary, the processor 130 may perform the size-converting process on the undistorted fisheye image FB2. The processing for the undistorted fisheye image FB2 described below is all directed to the undistorted fisheye image FB2 which has been size-converted.

In an embodiment, the processor 130 may use the intrinsic parameters (or the extrinsic parameters) to perform the size-converting process. For example, the processor 130 may obtain a size conversion proportion through the camera parameters (for example, the intrinsic parameters and/or the extrinsic parameters) of the two cameras, and then adjust the size of the two images through the above size conversion proportion to achieve the purpose of the two images being completely the same or nearly the same in size. For example, the processor 130 is also configured to: obtain a ratio of a focal length of the fisheye camera 120 to a focal length of the pinhole camera 110; and adjust the size of the pinhole image FA1 by the ratio (that is, the size-converted pinhole image FA2). Assume that the focal length of the fisheye camera 120 is 2 mm and the focal length of the pinhole camera 110 is 6 mm, the ratio of the focal length of the fisheye camera 120 to the focal length of the pinhole camera 110 is ⅓. The processor 130 reduce the size of the pinhole image FA1 in FIG. 2A by ⅓ to become the size-converted pinhole image FA2 in FIG. 4, so that the size-converted pinhole image FA2 and the undistorted fisheye image FB2 are consistent in imaging size. As a result, the purpose of adjusting the image size may be achieved by individually calibrating the focal lengths of individual cameras.

In step S160, as illustrated in FIG. 5, the processor 130 obtains the transformation relation between the pinhole image plane MA of the pinhole camera 110 and the fisheye image plane MB of the fisheye camera 120. The transformation relation includes, for example, the rotation matrix R and the translation vector T. The rotation matrix R and the translation vector T may be obtained by using the following equations (1) to (4).

For example, as illustrated in FIG. 5, the pinhole image plane MA has the target point $P_A$ which refer to a pinhole camera coordinate system $x_{A,C}$-$y_{A,C}$-$z_{A,C}$, and the target point $P_A$ may be represented as a coordinate $(u_A, v_A)$. The fisheye image plane MB has a corresponding point $P_B$ corresponding to the target point $P_A$, wherein the corresponding point $P_B$ refers to a fisheye camera coordinate system $x_{B,C}$-$y_{B,C}$-$z_{B,C}$, and the corresponding point $P_B$ may be represented as a coordinate $(u_B, v_B)$. The target point $P_A$ and the corresponding point $P_B$ correspond to the same physical point P. The physical point P is, for example, a point of an entity in the three-dimensional space, wherein such point may refer to the world coordinate system X-Y-Z and may be represented as a coordinate $(u_P, v_P, w_P)$. In the equations, $R_A$ and $T_A$ respectively represent the rotation matrix and translation vector of the pinhole camera 110, $R_B$ and $T_B$ respectively represent the rotation matrix and translation vector of the fisheye camera 120, the rotation relation between the two cameras is the rotation matrix R which represents the rotation relation between two cameras, and the translation vector T represents the translation relation between two cameras, wherein $K_A$ represents the intrinsic parameters of the camera A (for example, the pinhole camera), and $K_B$ represents the intrinsic parameters of the camera B (for example, the fisheye camera).

$$\begin{bmatrix} u_A \\ v_A \\ 1 \end{bmatrix} = K_A[R_A | T_A]\begin{bmatrix} u_P \\ v_P \\ w_P \end{bmatrix} \quad (1)$$

$$\begin{bmatrix} u_B \\ v_B \\ 1 \end{bmatrix} = K_B[R_B | T_B]\begin{bmatrix} u_P \\ v_P \\ w_P \end{bmatrix} \quad (2)$$

$$R_B = RR_A \quad (3)$$

$$T_B = RT_A + T \quad (4)$$

In an embodiment, the parameters $u_A$, $u_B$, $v_A$, $v_B$, $u_P$, $v_P$, $w_P$, $K_A$, $K_B$, $R_A$, $R_B$, $T_A$ and $T_B$ in equations (1) to (4) are given (or known), and the rotation matrix R and the translation vector T may be obtained according to equations (3) to (4).

During individual camera calibration, the rotation matrix and translation vector of the pinhole image plane MA of the pinhole camera 110 and the fisheye image plane MB of the fisheye camera 120 using the calibration tool 30 (the calibration tool 30 is illustrated in FIG. 5) may be obtained simultaneously, wherein the rotation matrix and translation vector represent a plane transformation relation between the individual camera coordinate system and the world coordinate system. The processor 130 may obtain the rotation relation and the translation relation of the image planes of two cameras in the world coordinate system, according to the rotation matrix and the translation vector of individual camera, by using dual camera calibration technology. For example, the rotation matrix R may be obtained by the above equation (3), and the translation vector T may be obtained by the above equation (4). If all pixels on the pinhole image plane MA and the fisheye image plane MB are located on the same plane relative to the world coordinate system, the target point $P_A$ of the pinhole image plane MA may be transformed to the corresponding point $P_B$ of the fisheye image plane MB by the above equations (1) to (4).

In an embodiment, in order to improve processor calculation efficiency, for example, the method of FIG. 6A to FIG. 6C2 may be used to reduce an image calculation region in subsequent steps; however, the invention is not limited thereto. In another embodiment, the ranging system may omit the FoV overlapping region and the non-FoV overlapping region in FIGS. 6A to 6C2.

As illustrated in FIG. 6A, the undistorted fisheye image FB2 has a FoV overlapping region FB21, a non-FoV overlapping region FB22 and at least one non-FoV overlapping region FB23, wherein the non-FoV overlapping regions FB22 and FB23 are adjacent to the FoV overlapping region FB21. For example, the non-FoV overlapping region FB22 is connected adjacent to a lower edge of the FoV overlapping region FB21, and the two non-FoV overlapping regions FB23 are connected adjacent to two opposite edges of the FoV overlapping region FB21. Furthermore, only the physical point appearing in an overlapping FoV of the first field-of-view VA of the pinhole camera 110 and the second field-of-view VB of the fisheye camera 120 are ranged. If the physical point appears in the non-FoV overlapping regions FB22 and FB23, no ranging will be performed on the physical point. Due to the undistorted fisheye image FB2 has defined the FoV overlapping region FB21, the processor 130 may know whether the physical point P appears in the FoV overlapping region FB21.

In an embodiment, the FoV overlapping region FB21 is a preset region. After the pinhole camera 110 and the fisheye camera 120 are installed on the mobile vehicle 10, an overlapping field-of-view V21 (the overlapping field-of-view V21 is illustrated in FIG. 1B) of the first field-of-view VA of the pinhole camera 110 and the second field-of-view VB of the fisheye camera 120 may be obtained in advance by testing, simulation and/or experiment, and the FoV overlapping region FB21 (the FoV overlapping region FB21 is illustrated in FIG. 4) of the undistorted fisheye image FB2 is obtained according to the overlapping field-of-view V21. After obtaining the FoV overlapping region FB21, the processor 130 may record the coordinate values of the FoV overlapping region FB21 relative to the undistorted fisheye image FB2. In addition, in the undistorted fisheye image FB2, the region outside the FoV overlapping region FB21 may be defined as the non-FoV overlapping region FB 22 and the non-FoV overlapping region FB23.

Another method of obtaining the non-FoV overlapping regions FB22 and FB23 will be described below with reference to FIGS. 6B1 to 6C2.

As illustrated in FIGS. 6B1 and 6B2, in an actual shooting, a lower edge 21 of the object 20 is just located at (or in contact with) a lower boundary of the overlapping field-of-view V21 (drawn in cross section in FIG. 6B1) of the first field-of-view VA and the second field-of-view VB (If the distance between the mobile vehicle 10 and the object 20 is closer, the lower edge 21 of the object 20 will disappear in the size-converted pinhole image FA2), and the tester may define a boundary FB22a of the non-FoV overlapping region FB22 accordingly. The coordinate value of the boundary line FB22a located in the undistorted fisheye image FB2 may be pre-stored in the processor 130 or in a memory accessible to the processor 130.

As illustrated in FIGS. 6C1 and 6C2, in an actual shooting, the right edge 21' of the object 20' is just located at (or in contact with) a right boundary of the overlapping field-of-view V21 (drawn in cross section in FIG. 6C1) of the first field-of-view VA and the second field-of-view VB (if the distance between the mobile vehicle 10 and the object 20' is closer, the right edge 21' of the object 20' will disappear in the size-converted pinhole image FA2), the tester may define a boundary FB23a of the non-FoV overlapping region FB23. Similarly, a left edge 21" of the object 20" is just located at (or in contact with) a left boundary of the overlapping field-of-view V21 of the first field-of-view VA and the second field-of-view VB (if the distance between the mobile vehicle 10 and the object 20" is closer, the left edge 21" of the object 20" will disappear in the size-converted pinhole image FA2), the tester may define the boundaries FB23a and FB23b of the non-FoV overlapping region FB23. The coordinate values of the boundaries FB23a and FB23b located in the undistorted fisheye image FB2 may be pre-stored in the processor 130 or in a memory accessible to the processor 130.

The boundaries between the above-mentioned FoV overlapping region and the non-FoV overlapping region may also be determined through determining boundaries, by system, according to the camera parameters or the camera installation positions.

In step S170, as illustrated in FIG. 7, the processor 130 obtains the corresponding point $P_B$ of the undistorted fisheye image FB2 corresponding to the target point $P_A$ of the size-converted pinhole image FA2 based on the transformation relation in step S160.

For example, the processor 130 may be configured to: based on the transformation relation, the epipolar line L1 of the undistorted fisheye image FB2 corresponding to the target point $P_A$ of the size-converted pinhole image FA2 by using, for example, Epipolar Geometry Model, wherein the epipolar line L1 includes a plurality of pixel points; and obtain the corresponding point $P_B$ of the undistorted fisheye image FB2 corresponding to the target point $P_A$ of the size-converted pinhole image FA2. For example, the processor 130 may select the pixel pointwith the highest similarity as the corresponding point $P_B$ through the similarity comparison by using multiple characteristics. The processor 130 selects the pixel point in the pixel points of the epipolar line L1 that is closest to the characteristic value of the target point $P_A$ as the corresponding point $P_B$. In an embodiment, the characteristic value is, for example, a grayscale value. In other words, the processor 130 may select the point that is closest to the target point $P_A$ in the grayscale value as the corresponding point $P_B$.

Then, the processor 130 may obtain the distance D (distance D is illustrated in FIG. 8) between the physical point P and the ranging system 100 (or the mobile vehicle 10) by using the coordinate $(u_A, v_A)$ of the target point $P_A$ and the coordinate $(u_B, v_B)$ of the corresponding point $P_B$. In an embodiment, the distance D may be calculated only when the corresponding point $P_B$ appears in the FoV overlapping region FB21.

In order to reduce the computational complexity of the processor, the calculation in step S170 may use the method of FIG. 6A to FIG. 6C2. For example, the FoV overlapping region FB21 of the undistorted fisheye image FB2 is selected to perform the calculation. The calculation in step S170 may also ignore the method of FIGS. 6A to 6C2, and use the undistorted fisheye image FB2 to perform the calculation.

In step S180, as illustrated in FIG. 8, the processor 130 obtains the distance between the ranging system 100 and the physical point P based on the aforementioned transformation relation, the target point $P_A$ and the corresponding point $P_B$. As illustrated in FIG. 8, a black dot marked as the pinhole camera 110 may represent the pinhole camera coordinate system $x_{A,C}$-$y_{A,C}$-$z_{A,C}$, and a black dot marked as the fisheye camera 120 may represent the fisheye camera coordinate system $x_{B,C}$-$y_{B,C}$-$z_{B,C}$. The pinhole camera 110, a center of the pinhole image plane MA, the target point $P_A$ and the physical point P may form a triangle $TR_A$, and the fisheye camera 120, a center of the fisheye image plane MB, the corresponding point $P_B$ and the physical point P may form a triangle $TR_B$. The processor 130 may obtain the distance D according to (or analyze) the triangle TRA and the triangle TRB by using a suitable geometric algorithm.

In the aforementioned embodiment, the fisheye image FB1 is taken as an example to perform the undistorting process. However, in another embodiment, the undistorting process may be performed on both of the fisheye image FB1 and the pinhole image FA1, and the size-converting process may be formed on both of the fisheye image FB1 and the pinhole image FA1. Furthermore, the ranging system includes a first camera (for example, the pinhole camera 110), a second camera (for example, the fisheye camera 120) and the processor 130. The first camera has the first field-of-view and is configured to capture a first image (for example, the pinhole image FA1) of a scene, and the second camera has a second field-of-view and is configured to capture a second image (for example, the fisheye image FA2) of the scene, wherein the second field-of-view is larger than the first field-of-view. The processor 130 is configured to: perform the undistorting process on the first image and the second image to obtain corresponding two undistorted images; calculate a size conversion proportion based on the camera parameters of the first camera and the second camera; perform the size-converting process on the two undistorted images to obtain corresponding two size-converted images based on the size conversion proportion, so that the size-converted images are consistent in the imaging size; obtain a transformation relation between a first image plane (for example, the pinhole image plane MA) of the first camera and a second image plane (for example, the fisheye image plane MB) of the second camera; obtain a corresponding point (for example, the corresponding point $P_B$) of one of two size-converted images corresponding to a target point (for example, the target point $P_A$) of the other of two size-converted images, wherein the target point and the corresponding point correspond to an physical point (for example, the physical point P) based on the transformation relation; and obtain a distance (for example, the distance D) between the ranging system and the physical point based on the transformation relation, the target point and the corresponding point.

In addition, the embodiments of the present invention are not limited to the types of the first camera and the second camera.

Referring to FIG. 10, FIG. 10 illustrates a flow chart of a ranging method according to another embodiment of the present invention. The steps S210 to S280 of the ranging method according to the embodiment of the present invention are similar or the same as the aforementioned steps S110 to S180, and at least one difference is that, in step S240, the undistorting process is performed on one of the first image captured by the first camera and the second image captured by the second camera, and, in step S250, the size-converting process is performed on the other of the first image captured by the first camera and the second image captured by the second camera. In another embodiment, in step S240, the undistorting process is performed on both of the first image captured by the first camera and the second image captured by the second camera to obtain two undistorted images, and in step S250, the size-converting process is performed on both of the two undistorted images to obtain two size-converted images. The subsequent processing to the first image and the second image are all directed to the undistorted images which have been size-converted.

In summary, embodiments of the present invention provide a ranging system, which includes two cameras and a processor. The two cameras may be disposed on the mobile vehicle, and the FoVs of two cameras are different, or the same. In an embodiment, one of two cameras may be a pinhole camera and the other of two cameras may be a wide-angle camera. In a ranging method of the ranging system, the processor is configured to: perform the undistorting process on the first image (captured by one of two cameras) to obtain the corresponding undistorted image; perform the size-converting process on the second image (captured by another of two cameras) to obtain the corresponding size converted image; obtain the transformation relation between two image planes of two cameras; obtain the corresponding point of the undistorted image corresponding to the target point of the size converted image based on the transformation relation; and obtain the distance between the ranging system and the physical point based on the transformation relation, the target point and the corresponding point. The aforementioned ranging method does not limit the relative configuration relation of the two cameras. For example, the two cameras may be staggered in the length direction of the moving vehicle, but not in the width direction of the moving vehicle; or the two cameras may be staggered in the length direction of the moving vehicle, but not in the width direction of the moving vehicle, or the two cameras may be staggered in the length direction and the width direction of the moving vehicle, or the two cameras may be staggered in the width direction of the moving vehicle, but not in the length direction of the moving vehicle. In another embodiment, the processor is configured to: perform at least one of the undistorting process and the size-converting process on the first image (captured by one of two cameras) to obtain the corresponding first processed image; perform at least one of the undistorting process and the size-converting process on the second image (captured by the other of two cameras) to obtain the corresponding second processed image; obtain the transformation relation between the two image planes of the two cameras; obtain the corresponding point of one of the first processed image and the second processed image corresponding to the target point of the other of the first processed image and the second processed image based on the transformation relation; and obtain the distance between the ranging system and the physical point based on the transformation relation, the target point and the corresponding point.

While the invention has been described by way of example and in terms of the preferred embodiment(s), it is to be understood that the invention is not limited thereto. Based on the technical features embodiments of the present invention, a person ordinarily skilled in the art will be able to make various modifications and similar arrangements and procedures without breaching the spirit and scope of protection of the invention. Therefore, the scope of protection of the present invention should be accorded with what is defined in the appended claims.

What is claimed is:

1. A ranging system, comprising:
   a pinhole camera having a first field-of-view (FoV) and configured to capture a pinhole image of a scene;
   a fisheye camera having a second field-of-view and configured to capture a fisheye image of the scene, wherein the second field-of-view is larger than the first field-of-view; and
   a processor configured to:
   perform an undistorting process on the fisheye image to obtain a corresponding undistorted fisheye image;
   perform a size-converting process on the pinhole image to obtain a corresponding size-converted pinhole image, wherein the corresponding size-converted pinhole image is consistent with the corresponding undistorted fisheye image in imaging size;
   obtain a transformation relation between a pinhole image plane of the pinhole camera and a fisheye image plane of the fisheye camera;
   obtain a corresponding point of the corresponding undistorted fisheye image corresponding to a target point of the corresponding size-converted pinhole image based on the transformation relation, wherein the target point and the corresponding point correspond to a physical point; and
   obtain a distance between the ranging system and the physical point based on the transformation relation, the target point and the corresponding point;
   wherein the undistorted fisheye image has a FoV overlapping region;
   wherein the FoV overlapping region is a preset region; the processor is further configured to:
   obtain an epipolar line of the corresponding undistorted fisheye image corresponding to the target point of the corresponding size-converted pinhole image based on the transformation relation, wherein the epipolar line comprises a plurality of pixel points.

2. The ranging system according to claim 1, wherein the pinhole camera and the fisheye camera are disposed on a moving vehicle, and the pinhole camera and the fisheye camera are staggered in a length direction of the moving vehicle.

3. The ranging system according to claim 1, wherein the processor is further configured to:
perform a color tone alignment processing on the pinhole image and the fisheye image to make the pinhole image and the fisheye image consistent in tone.

4. The ranging system according to claim 1, wherein the processor is further configured to:
obtain the corresponding point of the FoV overlapping region of the corresponding undistorted fisheye image corresponding to the target point of the size-converted pinhole image according to the transformation relation.

5. The ranging system according to claim 4, wherein the corresponding undistorted fisheye image further has a non-FoV overlapping region; the non-FoV overlapping region is connected adjacent to a side edge and a lower edge of the FoV overlapping region; the processor is further configured to:
obtain the corresponding point of the pixel points of the epipolar line that is closest to the target point in a characteristic value.

6. The ranging system of claim 1, wherein the processor is further configured to:
obtain a ratio of a focal length of the fisheye camera to a focal length of the pinhole camera; and
reduce a size of the pinhole image by the ratio.

7. A ranging method, comprising:
capturing, by a pinhole camera, a pinhole image of a scene, wherein the pinhole camera has a first field-of-view;
capturing, by a fisheye camera, a fisheye image of the scene, wherein the fisheye camera has a second field-of-view, wherein the second field-of-view is larger than the first field-of-view;
performing, by a processor, an undistorting process on the fisheye image to obtain a corresponding undistorted fisheye image;
performing, by the processor, a size-converting process on the pinhole image to obtain a corresponding size-converted pinhole image, wherein the corresponding size-converted pinhole image is consistent with the corresponding undistorted fisheye image in imaging size;
obtaining, by the processor, a transformation relation between a pinhole image plane of the pinhole camera and a fisheye image plane of the fisheye camera;
obtaining, by the processor, a corresponding point of the corresponding undistorted fisheye image corresponding to a target point of the corresponding size-converted pinhole image based on the transformation relation, wherein the target point and the corresponding point correspond to a physical point; and
obtaining, by the processor, a distance between the ranging system and the physical point based on the transformation relation, the target point and the corresponding point;
wherein the corresponding undistorted fisheye image has a FoV overlapping region;
wherein the FoV overlapping region is a preset region, and the ranging method further comprises:
obtaining, by the processor, an epipolar line of the corresponding undistorted fisheye image corresponding to the target point of the corresponding size-converted pinhole image based on the transformation relation, wherein the epipolar line comprises a plurality of pixel points.

8. The ranging method according to claim 7, wherein the pinhole camera and the fisheye camera are disposed on a moving vehicle, and the pinhole camera and the fisheye camera are staggered in a length direction of the moving vehicle.

9. The ranging method according to claim 7, further comprising:
performing, by the processor, a color tone alignment processing on the pinhole image and the fisheye image to make the pinhole image and the fisheye image consistent in tone.

10. The ranging method according to claim 7, wherein the ranging method further comprises:
obtaining, by the processor, the corresponding point of the FoV overlapping region of the corresponding undistorted fisheye image corresponding to the target point of the corresponding size-converted pinhole image based on the transformation relation.

11. The ranging method according to claim 10, wherein the corresponding undistorted fisheye image further has a non-FoV overlapping region; the non-FoV overlapping region is connected adjacent to a side edge and a lower edge of the FoV overlapping region; the ranging method further comprises:
obtaining the corresponding point of the pixel points of the epipolar line that is closest to the target point in a characteristic value.

12. The ranging method according to claim 7, further comprising:
obtaining, by the processor, a ratio of a focal length of the fisheye camera to a focal length of the pinhole camera; and
reducing, by the processor, a size of the pinhole image by the ratio.

13. A ranging system, adapted for a mobile vehicle, and comprising:
a first camera having a first field-of-view and configured to capture a first image of a scene;
a second camera having a second field-of-view and configured to capture a second image of the scene, wherein the second field-of-view is larger than the first field-of-view; and
a processor configured to:
perform an undistorting process on one of the first image and the second image to obtain a corresponding undistorted image;
calculate a size conversion proportion based on camera parameters of the first camera and the second camera and perform a size-converting process on the other of the first image and the second image based on the size conversion proportion to obtain a corresponding size-converted image, wherein the corresponding size-converted image is consistent with the corresponding undistorted image in imaging size;
obtain a transformation relation between a first image plane of the first camera and a second image plane of the second camera;
obtain a corresponding point of the corresponding undistorted image corresponding to a target point of the corresponding size-converted image based on the transformation relation, wherein the target point and the corresponding point correspond to a physical point;

obtain a distance between the ranging system and the physical point based on the transformation relation, the target point and the corresponding point;

wherein the undistorted image has a FoV overlapping region;

wherein the FoV overlapping region is a preset region; the processor is further configured to:

obtain an epipolar line of the corresponding undistorted image corresponding to the target point of the corresponding size-converted image based on the transformation relation, wherein the epipolar line comprises a plurality of pixel points.

14. The ranging system according to claim 13, wherein the first camera is a pinhole camera and the second camera is a fisheye camera.

15. The ranging system according to claim 13, wherein the processor is further configured to:

obtain the corresponding point of the pixel points of the epipolar line that is closest to the target point in a characteristic value.

16. The ranging system according to claim 13, wherein the processor is further configured to:

obtain the corresponding point of the FoV overlapping region of the corresponding undistorted image corresponding to the target point of the size-converted image based on the transformation relation.

17. A ranging method, comprising:

capturing, by a first camera, a first image of a scene, wherein the first camera has a first field-of-view;

capturing, by a second camera, a second image of the scene, wherein the second camera has a second field-of-view, and the second field-of-view is larger than the first field-of-view;

performing, by a processor, an undistorting process on one of the first image and the second image to obtain a corresponding undistorted image;

calculate, by the processor, a size conversion proportion by camera parameters of the first camera and the second camera and performing a size-converting process on another of the first image and the second image based on the size conversion proportion to obtain a corresponding size-converted image, wherein the corresponding size-converted image is consistent with the corresponding undistorted image in imaging size;

obtaining, by the processor, a transformation relation between a first image plane of the first camera and a second image plane of the second camera;

obtain, by the processor, a corresponding point of the corresponding undistorted image corresponding to a target point of the corresponding size-converted image based on the transformation relation, wherein the target point and the corresponding point correspond to a physical point; and obtain, by the processor, a distance between the ranging system and the physical point based on the transformation relation, the target point and the corresponding point;

wherein the corresponding undistorted image has a FoV overlapping region;

wherein the FoV overlapping region is a preset region, and the ranging method further comprises:

obtaining, by the processor, an epipolar line of the corresponding undistorted image corresponding to the target point of the corresponding size-converted image based on the transformation relation, wherein the epipolar line comprises a plurality of pixel points.

18. The ranging method according to claim 17, wherein the first camera is a pinhole camera and the second camera is a fisheye camera.

19. The ranging method according to claim 17, further comprising:

obtaining the corresponding point of the pixel points of the epipolar line that is closest to the target point in a characteristic value.

20. The ranging method according to claim 17, wherein the ranging method further comprising:

obtaining, by the processor, the corresponding point of the FoV overlapping region of the corresponding undistorted image corresponding to the target point of the corresponding size-converted image based on the transformation relation.

* * * * *